United States Patent [19]

Klensch

[11] 3,914,762

[45] Oct. 21, 1975

[54] ELECTRONIC IDENTIFICATION SYSTEM

[75] Inventor: Richard Joseph Klensch, Trenton, N.J.

[73] Assignee: RCA Corporation, New York, N.Y.

[22] Filed: Dec. 27, 1973

[21] Appl. No.: 428,721

[52] U.S. Cl. ........................ 343/6.5 SS; 343/6.8 LC
[51] Int. Cl.[2] ............................................ G01S 9/56
[58] Field of Search ......... 343/6.5 R, 6.5 LC, 6.8 R, 343/6.8 LC, 6.5 SS

[56] References Cited

UNITED STATES PATENTS

| | | | |
|---|---|---|---|
| 3,713,148 | 1/1973 | Cardullo et al. | 343/6.5 R |
| 3,754,250 | 8/1973 | Bruner | 343/6.5 LC |
| 3,798,641 | 3/1974 | Preti | 343/6.5 SS |
| 3,798,642 | 3/1974 | Augenblick et al. | 343/6.5 SS X |
| 3,839,717 | 10/1974 | Paul | 343/6.5 LC |

*Primary Examiner*—T. H. Tubbesing
*Attorney, Agent, or Firm*—Edward J. Norton; Joseph D. Lazar; Michael A. Lechter

[57] ABSTRACT

An electronic detection and identification system operating with correlated microwave frequencies wherein a transmitter continuously transmits a beam of electromagnetic energy, in a predetermined direction, so as to impinge on an identification tag suitably attached on a passing object. The identification tag derives a harmonic signal from the impinging beam and radiates a beam of energy, at the harmonic frequency, which is pulse modulated in accordance with a preset identification code. The receiver receives the reflected beam and generates signals representative of the code modulation.

10 Claims, 15 Drawing Figures

ELECTRONIC IDENTIFICATION SYSTEM

BACKGROUND OF THE INVENTION

FIELD OF THE INVENTION

This invention relates to an electronic detection and identification system, and in particular, to a vehicle identification system.

With the ever increasing volume of traffic on public highways, traffic bottlenecks, such as toll booths, are becoming serious problems. There is thus a need for a means of identifying vehicles and recording such identification from a remote site without requiring the vehicle to stop or slow down.

Various optical systems have been proposed but have been found unsuited to a highway environment, since they require maintenance in that lenses, "windows," and optical indicia must be kept substantially dirt free or erroneous readings may result. Moreover, a critical spatial alignment is usually required between the optical sensors and optical indicias.

Radio frequency transponder systems such as that described in U.S. Pat. No. 3,270,330, have been employed in vehicle identification. However, such systems are too bulky and expensive for so wide spread an application as general automotive vehicle identification.

Microwave transponder systems, such as that disclose in U.S. Pat. No. 3,745,569, provide a transponder, of small dimensions, containing an oscillator and a preset memory comprising a plurality of counters and decoders and a diode matrix. The transmitter component provides a pulse modulated interrogation beam to energize the oscillator and drive the memory. It should be noted, however, that the oscillator frequency is different from and not related to the transmitter frequency, i.e., the interrogation and return signals are uncorrelated. The output of the preset memory is utilized to pulse modulate the oscillator output signal with a preset identification code and the modulated signal is transmitted to a receiver adapted to identify the code.

However, such systems using active microwave elements, such as an oscillator are, for the practical reason that microwave oscillators are usually unreliable at the higher frequency bands, limited to a modulated return signal in the lower bands of the microwave region of the electromagnetic spectrum. For example, in the systems disclosed in U.S. Pat. No. 3,745,569, the interrogation beam is of a x-band microwave frequency (8,000 – 12,500 MHz) while the frequencies of the modulated return signal from the oscillator are in the L band (1,000 – 2,000 MHz). Utilization of such lower frequency information carrying return signals is disadvantageous as compared to x-band or $k_u$ band (12.5 – 18 GHz) returns for several reasons: (1) spectrum availability is greater in the higher regions; (2) there is greater freedom from electromagnetic interference (EMI) at the higher bands of frequencies; and (3) the realizable gain of the antenna is larger for a given overall antenna size at the higher frequencies.

In addition, the use of uncorrelated interrogation and return frequencies as in such a system as described in U.S. Pat. No. 3,745,569 necessitates the use of wide band detectors. Moreover, the transmission power requirements of such systems make it difficult to stay within a safe radiation limit.

Vehicle detection systems has been described in which a "reflected" second harmonic of a transmitted fundamental signal is derived from the transmitted fundamental signal and detected. These disclosed systems also provide for use of passive non-linear elements which are, in turn, deployed as targets to derive and reflect the second harmonic signal. One such system, is described in U.S. Pat. No. 3,781,879, entitled "Harmonic Radar Detecting and Ranging System for Automotive Vehicles," based on the invention of Harold Staras and Joshua Sefer. and assigned to the same assignee as the present application. The target of the system described in U.S. Pat. No. 3,781,879, provides a derived harmonic return signal which is orthogonal to the polarization of the transmitted fundamental signal thereby providing polarization, as well as frequency, i.e. harmonic frequency return signal discriminants against "blinding" and clutter.

Another such system, described in U.S. Pat. No. 3,631,484, further discloses effecting an amplitude modulation of the reflected signal by applying an analog periodic bias voltage to the non-linear device. The amplitude modulation is utilized to cause a shift of the modulated frequency equal to the modulating frequency. The frequency of the modulating voltage is measured and particular vehicles are identified by their individual modulation characteristics. Analog modulation identification systems are disadvantageous in that they do not readily lend themselves to automatic correlation techniques for large numbers of vehicles.

The present invention overcomes the disadvantages and problems present in the prior art by providing an electronic detection and identification system operating with coherent x-band and $k_u$-band microwave frequencies, utilizing no active microwave components and utilizing a digital identification code compatible with large scale usage.

SUMMARY OF THE INVENTION

The present invention provides a short-range detecting and identification system comprising a transmitter, receiver, and output processing means cooperating with any one of a plurality of remote identification tags. The transmitter generates electromagnetic energy signals of a predetermined frequency, which are suitably directed to impinge upon a passing tag. Each tag comprises a harmonic radiator which derives from the transmitted signals received harmonically related signals; means for pulse modulating the harmonically related signals in accordance with a predetermined digital identifiaction code; and timing means for deriving a clock signal for the encoder. The receiver detects the modulated harmonic signals radiated from the tag and generates output signals indicative of the identification code modulation of the radiated signals. Means, according to the invention, are also provided to decode the output signals of the receiver to determine the identification code number of the passing tag.

DESCRIPTION OF THE DRAWING

Embodiments of the invention are described in the following detailed description taken in connection with the accompanying drawing wherein.

DETAILED DESCRIPTION OF THE PREFERRED EMBODIMENTS

Figure 1:
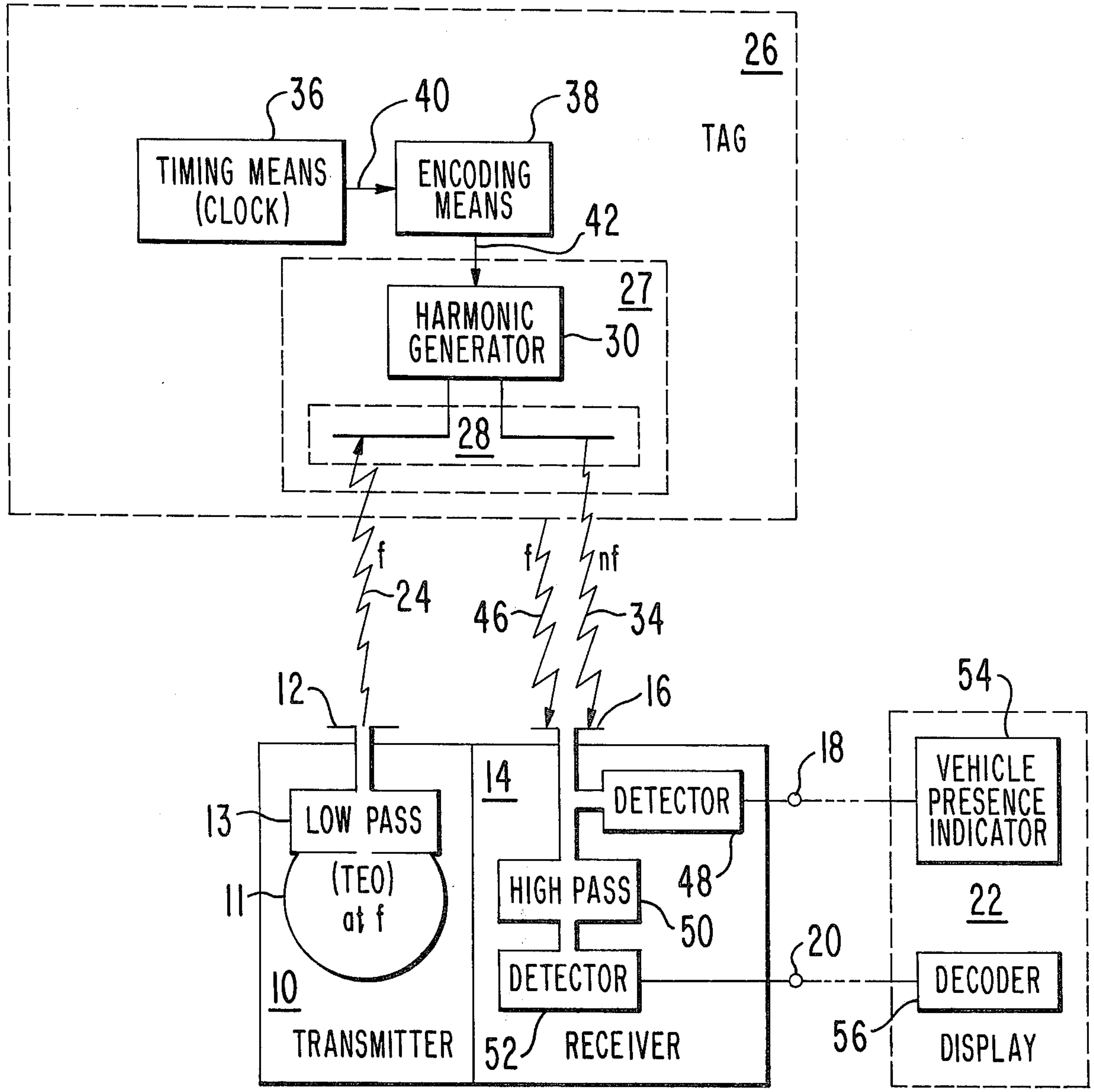
FIG. 1 is a block schematic illustration of an embodiment of the present invention.

Referring now to the drawing, there is shown in FIG. 1 a short range detecting and identification system, according to the invention, having a transmitter 10 coupled to a suitable directional transmitter antenna 12, and a receiver 14 coupled to a directional receiving antenna 16. Receiver 14 includes output terminals 18 and 20 which are connected to output processing means, generally indicated as display 22, which may be remotely situated from the receiver.

Transmitter 10 is arranged to generate electromagnetic energy signals of a predetermined frequency f, at low power in the order of 150 milliwatts, by use of a negative resistance semiconductor device, such as TEO 11, coupled to filter means, such as a low pass filter 13, to prevent spurious harmonics passing to transmitting antenna 12.

Antenna 12, preferably having directional characteristics, is arranged to direct a beam of electromagnetic energy signals 24 of predetermind frequency, f, in a predetermined direction to expose to the beam a tag carried on a vehicle or person positioned in or passing therethrough.

The target or tag 26 as shown in FIG. 1 is formed of a harmonic radiator 27, comprising an antenna 28, adapted to operate at a base frequency ($f$) and a chosen harmonic thereof, and a harmonic generator 30. Antenna 28 is arranged to receive the predetermined frequency ($f$) signal beam 24 from the transmitter 10, and is coupled across harmonic generator 30. Harmonic generator 30 is formed of a passive non-linear element, such as, for example, a zero bias Schottky barrier silicon diode.

Figure 1A:
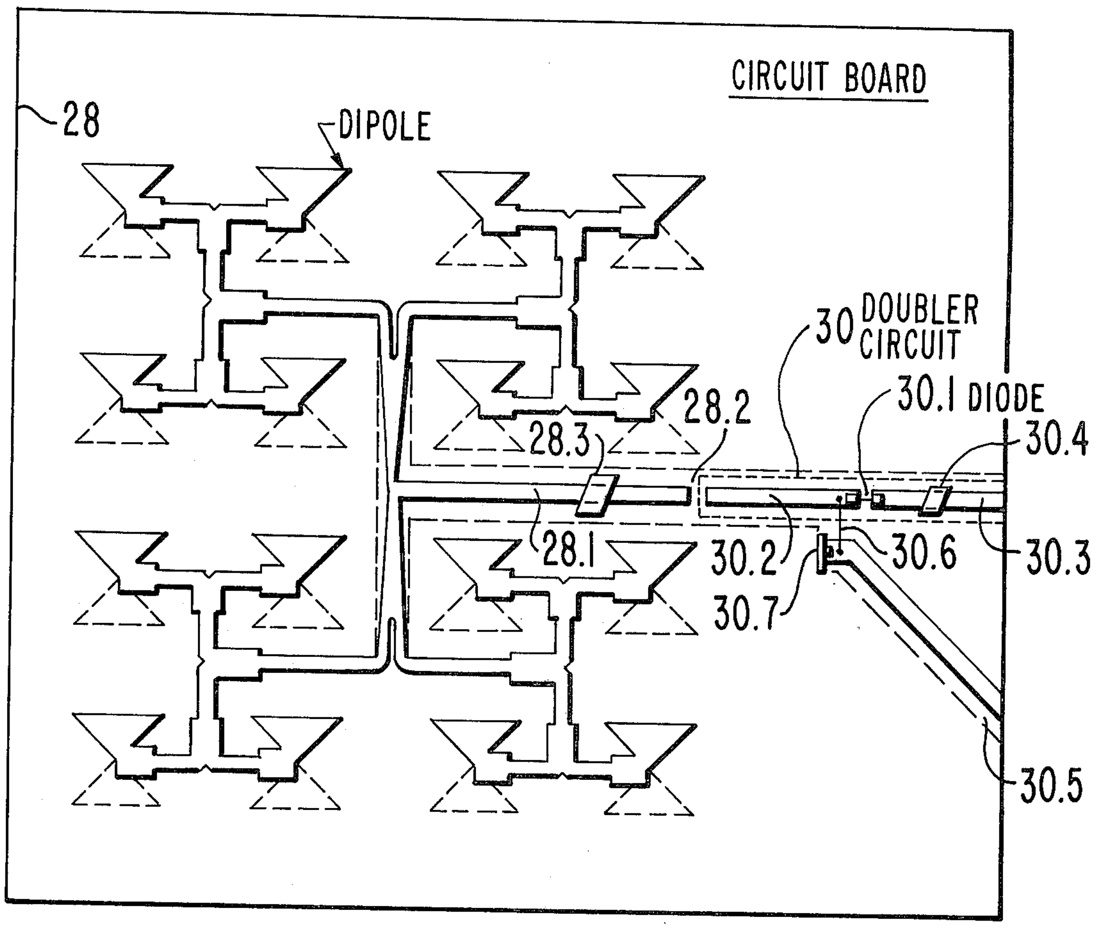
FIG. 1*a* is a schematic illustration of a suitable harmonic radiator for use in the tag of FIG. 1.

Antenna 28 is suitably a flat corporate-network printed circuit antenna system, of the type described in U.S. Pat. No. 3,587,110, comprising 16 dipoles and a corporate feed, being tuned to the geometric mean frequency between the base frequency $f$ and the chosen harmonic thereof. For example, if base frequency $f$ is chosen to be 8.75 GHz (X-band), and the chosen harmonic is the second harmonic ($2f$) thereof, namely 17.5 GHz ($K_u$-band), the antenna dipoles are one-half wavelength long at 12.4 GHz. FIG. 1*a* is a schematic showing such an antenna structure. One-half of the antenna pattern is etched on one side of a circuit board (indicated by solid lines in FIG 1*a*) suitably a 0.020 inch thick, double clad board, 3-inches wide by 3.5 inches long (for the examplary base frequency 8.75 GHz); the other half of the antenna patternn being etched on the opposite side of the board (indicated by dotted lines). The corporate feed structure 28.1 is coupled to harmonic generator 30, here a double circuit, by means of a capacitive gap 28.2 etched on the first half of the circuit pattern. Impedance transformers included in the feed structure match the antenna inpedance to the doubler at 8.75 GHz and 17.5 GHz. To acheive a unidirectional radiation pattern from the antenna a back cavity is placed behind the antenna. A polystyrene sheet 0.240 inches thick by 3 inches square maintains the spacing of the antenna in the back cavity. A spacing of 0.240 inches corresponds to a quarter wavelength at the geometric means frequency 12.4 GHz.

Figure 1B:
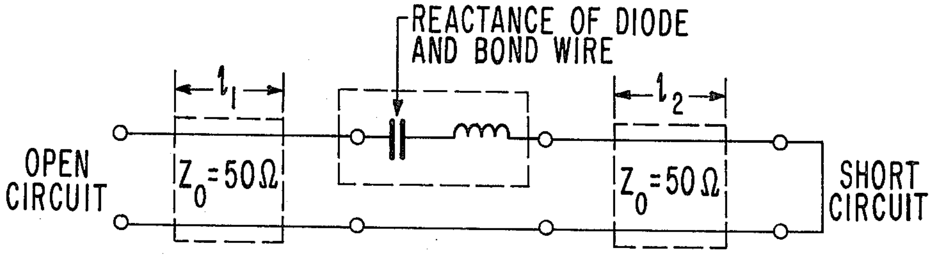
FIG. 1*b* is a schematic of the equivalennt circuit of a harmonic generator utilized in the harmonic radiator of FIG. 1*a*.

The harmonic generator (doubler circuit) 30 consists of a nonlinear element 30.1 (suitably a Schottky barrier diode chip) assymetrically disposed between an open circuit 50Ω transmission line 30.2 and a short circuit 50Ω transmission line 30.3. The lengths of the open circuit and short circuit lines were chosen so that the equivalent circuit of transmission line and diode is resonant at 8.75 GHz and 17.5 GHz. The equivalent circuit of harmonic generator (double circuit) 30, is shown in FIG. 1b. The resonant condition enhances the doubling efficiency at low microwave power levels. A matching stub 28.3 is placed 0.220 wave-lengths at 8.75 GHzfrom the open circuit end toward the antenna 28 to enhance the power coupled from the antenna to doubler at 8.75 GHz. Similarly, a reactive termination, 30.4, suitably an open circuit 44Ω stub, is placed on the short circuit line 30.3 where the 17.5 GHz signal is near maximum, i.e., approximately a quarter wavelength at 17.5 GHz from the short circuit end; suitably 0.375 wavelengths from the short, to recover the 17.5 GHz (harmonic) signal at the antenna 28.

It should be apparent to those skilled in the art that separate receiving and radiating antennas can be readily utilized in the stead "dual frequency" antenna above described.

Referring again to FIG 1, antenna 28 radiates the output signals of harmonic generator 30, generated in response to signal 24, as a directional beam 34 of electromagnetic energy in the direction of the source of signal 24. The beam 34 may include components at the base frequency $f$ (here 8.75 GHz) of the signal 24, as well as components at frequencies harmonically related thereto. Output signal 34 of harmonic generator 30 may be filtered, if desired, as by the resonant transmission lines shown in FIG. 1*b*, to substantially attenuate all but selected harmonic components, preferably the second harmonic. The signal beam 34 will, therefore, hereinafter, be referred to as harmonically related to the predetermined frequency $f$. Thus, if the plane of harmonic radiator 27 is orthogonal to the received radiation, radiator 27, radiates harmonic electromagnetic energy, in response to such impinging illumination of a corresponding fundamental frequency ($f$), in a direction, generally to the source (antenna 12) of the fundamental frequency elecromagnetic energy 24.

In the preferred embodiment of the invention, the predetermined frequency $f$ of the impinging beam 24 is a microwave frequency within the x-band region of the radiation spectrum, e.g. 8.75 GHz. Accordingly, the radiated harmonically related signal may then occur in the $K_u$-band of the spectrum, e.g. $2f = 17.5$ GHz wherein there is relatively higher spectrum availability and less electromagnetic interference (EMI) than at lower regions of the spectrum. Further, return signals in the higher regions allow utilization of a smaller antenna to acheive a given gain.

Tag 26 is provided with a timing means 36 and an encoding means 38. Timing means 26, suitably a crystal oscillator, provides a clock signal over conductor 40 (FIG. 1) to encoding means 38. Encoding means 38 includes suitable storage means (not shown) for storing a preset digital identification code and is coupled to harmonic generator 30 over conductor 42. For an antenna structure and harmonic generator such as shown in FIG. 1*a*, conductor 42 is coupled to a transmission line 30.5, and therefrom through a low pass filter 30.6 consisting of a 1 mil diameter wire, 0.140 inches long, serving as a rf (radio frequency) choke, and a 60 *pf* (pica farad) capacitor chip 30.7 to the open circuit transmission line 30.2 of the (doubler circuit) harmonic generator 30.

It should be noted that although conductors are shown in the drawing as single lines, they are not so shown in a limiting sense and that the conductors may comprise plural connections as understood in the art.

Referring again to FIG. 1, timing means 36 and encoding means 38 may be free running or triggered by illumination of tag 26 by signal 24 (as will later be explained in conjuction with FIG. 6). For either of such forms, illumination of tag 26 by beam 24 enables harmonic generator 30, and harmonic radiator 27 generates and transmits harmonic signals 34. Encoding means 38, driven by timing means 36 is arranged to inhibit selectively harmonic generator 30 for certain of the time periods defined by timing means 36, in accordance with the preset digital identification code. Alternatively, harmonic generator 30 can be normally inhibited and be selectively activated during periods of enabling illumination by the encoding means 38. Thus, the radiating second harmonic beam 34 is effectively pulse modulated in accordance with the preset identification code.

Receiving antenna 16 of receiver 14 is arranged to be illuminated by signals radiated from tag 26; the harmonic signals of beam 34, and beam 46, representing signals reflected in a conventional skin radar sense, from the tag, and the vehicle or person to which the tag is affixed. Receiver 14 maintains a sufficiently wide bandwidth to enable it to receive such signals. Receiving antenna 16 may be a suitable dual frequency antenna or comprise suitable separate antennas respectively tuned to the fundamental frequency ($f$) and the desired harmonics.

Receiver 14 includes a detector 48 connected in parallel with a serially connected high pass filter 50 and detector 52, each of the parallel branches being receptive of the signals received by antenna 16.

Detector 48, suitably a diode detector, generates an output signal, comprising the modulation envelope (waveform) of the totality of the received signals; both skin radar type reflection 46 and harmonically related signals 34 from the tag 26, thereby indicating the passage of any vehicle or object, whether or not such vehicle is carrying a tag 26, and if such vehicle is carrying a tage 26, whether or not the tag is operating to provide an identification, as will hereinafter be further explained. The output signals of detector 48 at terminal 18 are suitably communicated to a suitable indicator, serving as a vehicle presence indicator 54, in the display or output processing means 22.

Signals 34 and 46 received by antena 16 are also routed through high pass filter 50 and to detector 52, again suitably a diode detector. High pass filter 50 is arranged to attenuate all signals below the selected harmonic frequecny, e.g. $2f$, thus alleviating the need for strict filtering of the harmonic generator output signals in the tag. The output signal of detector 52 is, thus, the pulse-modulation envelope of the radiated harmonic beam 34. The detected pulse modulation waveform is passed from detector 52 to terminal 20 and to a decoder 56 in the display or output processiing means 22.

In operation: a tag 26, when illumated by signal 24, responds by deriving and radiating harmonically related signals 34, which are pusle modulated according to a preset code for each tag. Receiver 14 detects received harmonically related signals 34 and any signals 46 reflected, as in conventional skin radar, from the vehicle to which the tag 26 is affixed, to provide indication of the presence of a vehicle and establish the identification of such vehicle if the vehicle bears an operable tag.

Figure 3:
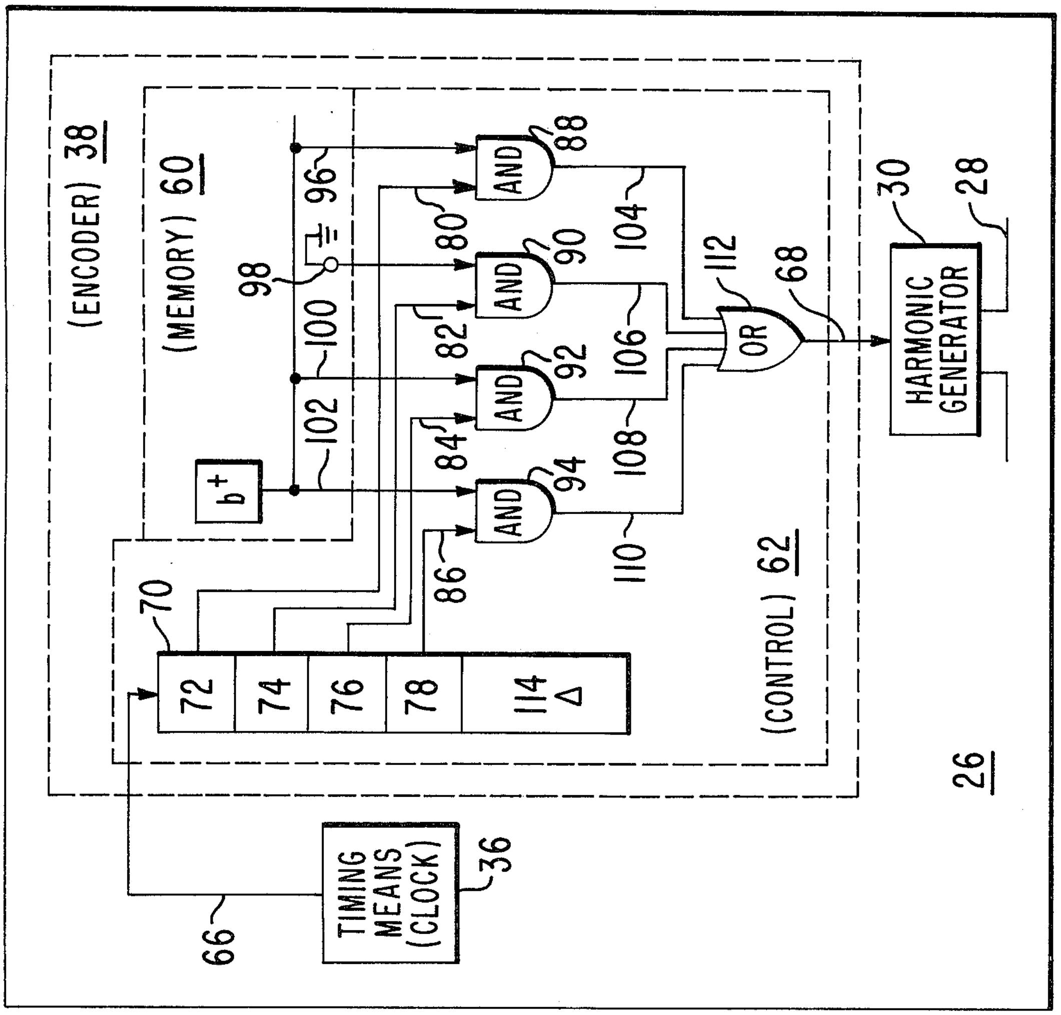
FIGS. 2, 3, and 4 are block schematics showing embodiments of the identification tag according to the invention, utilizing storage and control means for encoding the reflected harmonic signal.

Encoding means 38 of tag 26 may be implemented in any of several forms as will be described with reference to FIGS. 2, 3, and 4.

Figure 2:
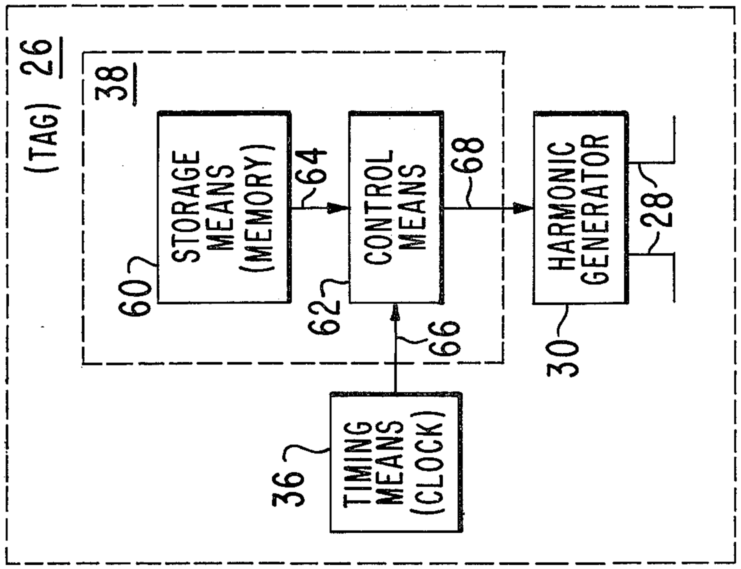

FIG. 2 illustrates tag 26 utilizing an arrangement of encoding means 38, which comprises a binary logic storage means 60 connected to control means 62 through conductor 64. Timing means 36 supplies clock signals to control means 62 through conductor 66. Control means 62 communicates with harmonic generator 30 through line 68.

Control means 62 is arranged to respond to the clock signals from timing means 36 to successively pass the binary content of each individual member bit of storage means 60 to the harmonic generator 30, as an appropriate enabling or inhibiting control signal.

Storage means 60 may be a suitable binary logic read only memory (ROM) while control means 62 may be a suitable gating circuit of binary logic both well known in the art.

Control means 62 may be formed of a plurality of AND gates and a ring counter. Referring to FIG. 3, tag 26 is shown utilizing such an arrangement of AND gates and a ring counter. Timing means 36, through conductor 66, drives a suitable ring counter 70 comprising a plurality of member bits 72, 74, 76, 78, for a four-digit code. The output terminals for the individual member bits 72–78 are connected, via conductors 80–86 respectively, to one input terminal of respective associated gating means, such as two input AND gates 88–94. The second input terminals 96, 98, 100, and 102 of two input AND gates 88–94, are respectively connected to a voltage bit or ground provided by storage means 60 corresponding to a logical zero, in accordance with the desired preset identification code. The output terminals 104–110 of AND gates 88–94, are connected, respectively, to an OR gate 112 which communicates with harmonic generator 330 through conductor 68. FIG. 3 illustrates thus a tag for a preset four digit code. It will be clear that an additional ring counter bit and an associated and gate would be needed for each additional bit of code for this logic arrangement.

In operation, assuming that harmonic generator 30 is arranged to be normally inhibited and the encoding means 38 generates an enabling control signal, the following sequence of events occur for a preset identification code number 13 (binary 1101). Timing means 36 generates a (free running) clock signal, which sequentially advances a value of logical one through ring counter 70, beginning with member bit 72. The logic 1 value in bit 72 enables associated AND gate 88 for the duration of the clock interval. The second input terminal 96 of AND gate 88 receives in accordance with the binary code, a logical 1 value, i.e. it is connected to a B+ voltage by storage means 60. Thus, a logical 1 value is generated at AND gate 88 output terminal 104. The logical 1 valve is communicated to harmonic generator 30 via OR gate 112 and conductor 68. Thus, the harmonic generator 30 is enabled for the first clock pulse. The second clock pulse from timing means 36 advances the logical one value on line 82 and thereby enabling associated AND gate 90. However, in accordance with the preset code, storage means 60 applies a logic 0 value to the second input terminal 18, i.e. does not connect terminal 98 to B+ voltage, but instead is connected to a ground and a logic zero voltage is established on output terminal 106 of AND gate 90. Thus, the harmonic generator 30 remains inhibited for the duration of the second clock pulse. The third and fourth clock pulses from timing means 36, respectively, advance the logical 1 value to member bits 76 and 78 in the ring counter 70 and thereby enabling AND gates 92 and 94 for the respecitive clock pulses. The second terminals 100 and 102 of AND gates 92 and 94, in accordance with the identification code, have applied logical 1 values. Thus, a logical 1 value is established at output terminals 108 and 110 and the harmonic generator 30 is thereby enabled during the duration of the third and fourth clock pulses respectively. Subsequent clock pulses, advance the logical one value into delay line 114, which comprises a preset number of member bits, to establish a predetermined duration of off time to be utilized if desired by the decoder (56, FIG. 1 e.g.) as will be subsequently further explained.

Thus, the control means 62, in response to the timing means 36, selectively enables (or inhibits) the derivation (and radiation) of harmonics by harmonic radiator 27 in accordance with an identification code stored in storage means 60.

Figure 4:
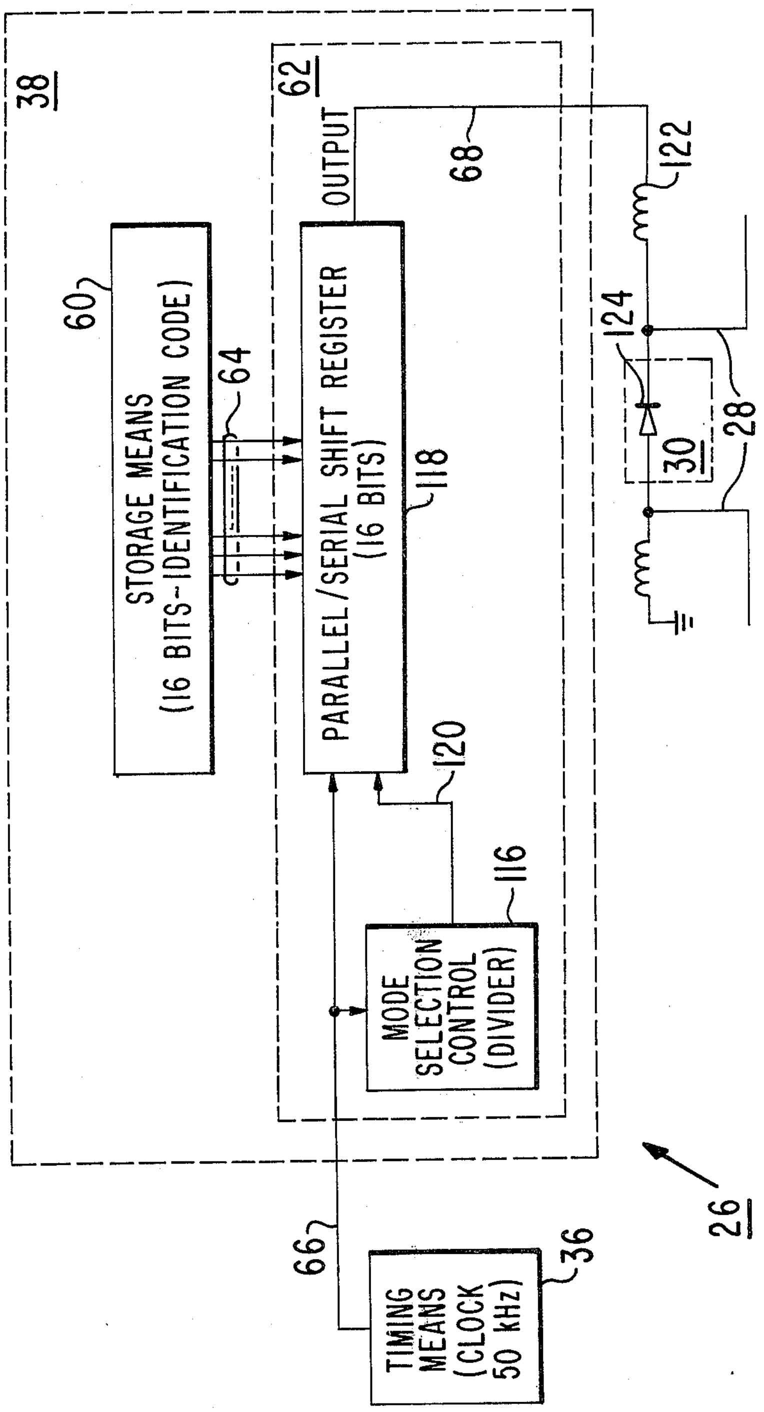

FIG. 4 is a schematic of a preferred embodiment of tag 26 wherein control means 62 is formed of a parallel load, serial output type shift register and a mode selection control for the register. Timing means 36 supplies continuous clock pulses over conductor 66 to automatic mode selection means 116, suitably a counter/divider, and shift register 118. Shift register 118 is also receptive of a mode control signal from mode selection means 116 over conductor 120 and is receptive (in parallel) of the contents of storage means 60 over parallel line 64. The output signals of shift register 118 are applied to harmonic generator 30 through conductor 68 and r.f. choke 122.

In operation, mode selection means 116, in accordance with the clock signals received from timing means 36, supplies a control signal, e.g. logic 1, to shift register 118, causing it to operate in a parallel load mode. Shift register 118, is loaded (in parallel) with the contents of storage means 60 by applying B+ voltage to specified member bits in accordance with the identification code and ground to remainder bits.

At the end of the specified number of clock pulses e.g. 16 pulses, mode selection means 116 is arranged to supply a second control signal, e.g. logic 0, causing shift register 118 to switch to a serial output mode, thereafter progressively advancning the predetermined loaded code to successive member bits in response to the clock signals from timing means 36. The binary code (e.g. 16 bits) is applied, via conductor 68 and r.f. choke 122, to a suitable harmonic generator 30, such as non-linear diode element 124, as an appropriate biasing voltage to inhibit (or enable) second harmonic generation in accordance with the preset code as previously described. R.f. choke 122 serves to block any r.f. signal leakage from antenna 28 to encoding means 38.

After a sufficient number of clock pulses (16-pulses) to advance the predetermined specified code length (16 bits) out of shift register 118, mode selection means 116 provides the parallel load control signal (logic 1) and shift register 118 is thereby reloaded with the same code number preset in storage means 60 in the manner previously described, thus continuously repeating the cyclic operation in accordance with the clock signals.

The embodiment of FIG. 4 has been implemented for a 32 bit code utilizing an RCA CD4004 COS-MOS 32 bit counter for the mode selection means 116 and two serially connected RCA CD4014 COS-MOS 8-stage shift registers for shift register 118. The storage means 60 provides for 16 active bits of a 32 bit identification code. The code also includes 16 bits of off time, during which the shift registers 118 are loaded.

Other forms of the tag of the type illustrated in FIG. 4 will be readily apparent to those skilled in the art.

FIGS. 5 through 8 are schematics illustrating further embodiments having additional features of a tag according to the invention.

Figure 5:
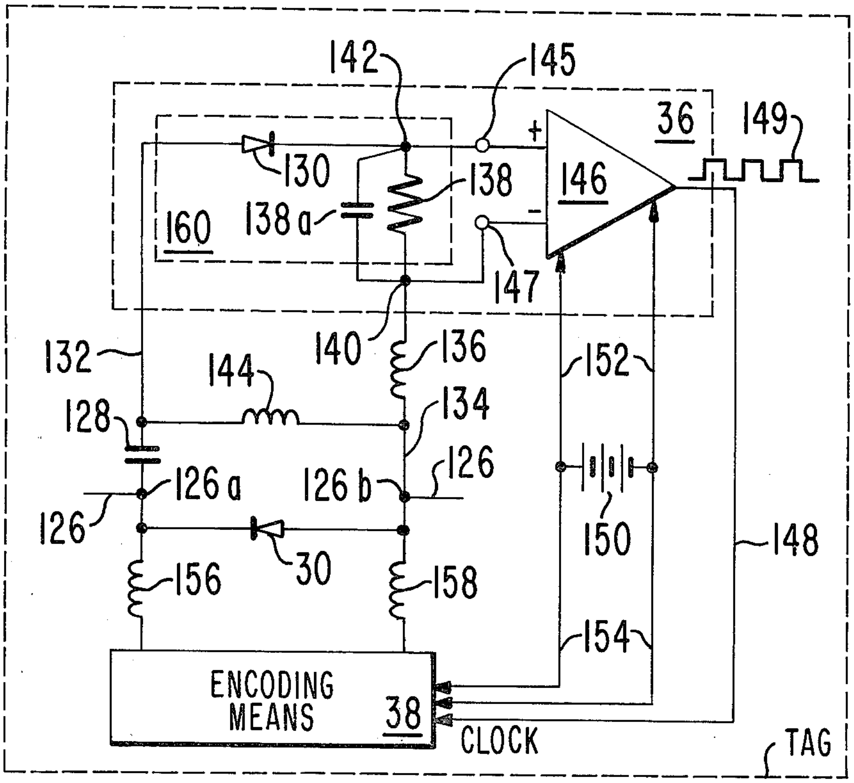
FIG. 5 is a block schematic showing an embodiment of the identification tag, including a power source for the encoding means and means to derive a clock signal from the impinging predetermined frequency signal.

FIG. 5 is a schematic illustrating a tag 26, including a power source 150 for timing means 36 and encoding means 38, for use in systems where the impinging signal 24 from transmitter 10 (FIG. 1) is pulse modulated with a signal having a specified duty cycle, such as 50% (square wave amplitude modulation). In such an arrangement, timing means 36 detects and amplifies the pulse modulation envelope of the impinging signal 24 and the amplified signal is utilized as the clock signal.

Specifically, one terminal **126*a* of the balanced transmission line that feeds tag antenna 126 is connected through a coupling capacitor 128 to the anode of a detector diode 130 over conductor 132. The other terminal 126b of the balanced transmission line that feeds tag antenna 126 is connected over conductor 134, through an r.f. choke 136, to one terminal of resistor 138. The other terminal of resistor 138 is connected to the cathode of detector diode 130 at junction 142. A capacitor 138*a*, serving as an r.f. bypass, is also connected across resistor 138. Conductors 132 and 134** are connected together through an r.f. (radio frequency) choke 144. The r.f. choke 144 has a small impedance at low frequencies, but presents a high impedance to high frequency signals and hence "chokes off" high frequency signals but allows a D.C. return for capacitor 128. An operational voltage amplifier 146 is connected across resistor 138, with its non-inverting input 145 connected at the junction 142 between resistor 138 and diode 130, and its inverting input 147 connected at junction 140. The output of amplifier 146 is coupled over conductor 148 to encoding means 38 as a clock signal 149. Amplifier 146 and encoding means 38 are powered by a power supplly such as dry cell battery 150 over conductors 152 and 154, respectively. Encoding means 38 is connected across a non-linear element harmonic generator 30 through r.f. chokes 156 and 158. Harmonic generator 30 is, in turn, connected across the balanced transmission line that feeds tag antenna 126.

In operation of the tag of FIG. 5, detector diode 130, resistor 138, and capacitor 138*a* function as an envelope detector 160, which detects the modulation envelope of the remotely transmitted predetermined frequency (*f*) beam impinging on antenna 126. A signal having the waveform of the modulation waveform is amplified by amplifier 146 and applied to encoding means 38 as clock signal 149. Blocking capacitor 128 and r.f. chokes 136, 144, 156, and 158, serve respectively to maintain isolation of the d.c., the code molulation, and r.f. signals by virtue of their frequency dependent reactances.

Figure 6:
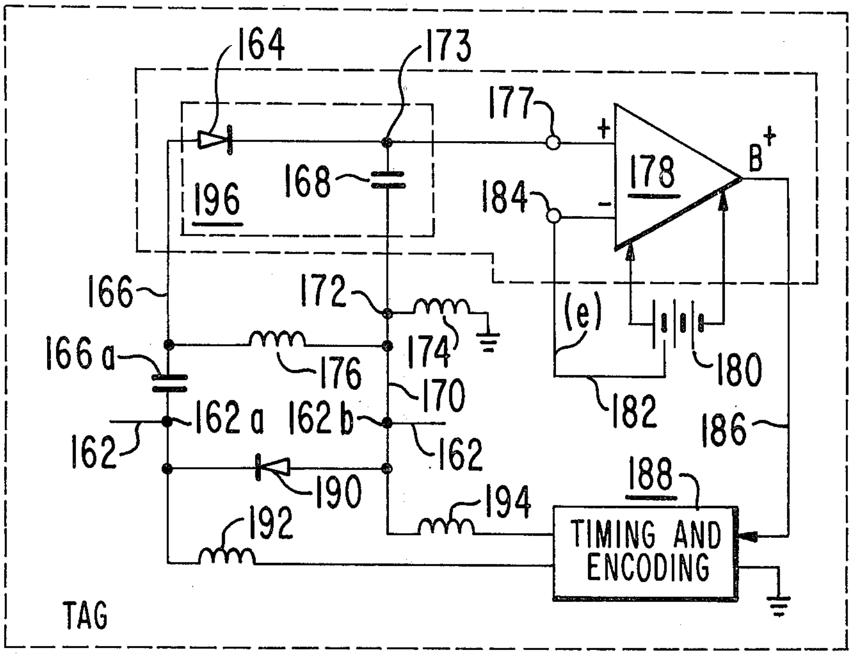
FIG. 6 is a block schematic showing an embodiment of the tag including switching means whereby the power source is applied to the timing and encoding means only in the presence of the impinging predetermined frequency signal.

FIG. 6 is a schematic illustrating a tag according to the invention wherein power is applied to the timing and encoding means only when signals of predetermined frequency impinge on the tag. Specifically, one terminal 162a of the balanced transmission line that feeds tag antenna 162 is connected to the anode of a rectifier diode 164 through capacitor (C) 166*a* by conductor 166. The second terminal 162*b* of the balanced transmission line that feeds tag antenna 162 is connected to one terminal of capacitor 168 by conductor 170, at junction 172. The second terminal of capacitor 168 is connected to the cathode of detector diode 164 at junction 173. Junction 172 is d.c. grounded through r.f. choke 174. Conductors 166 and 170 are d.c. coupled through r.f. choke 176. The non-inverting input 177 of an operational voltage amplifier 178 is connected to junction 173 between detector diode 164 and capacitor 168. A power supply (battery 180) provides power for amplifier 178 and is tapped by conductor 182 to supply a small d.c. voltage *e* to the inverting input terminal 184 of amplifier 178. The output signals of amplifier 178 are applied as B+ voltage over conductor 186 to timing and encoding means 188. Encoding means 188 is connected across a non-linear element 190, serving as a harmonic generator, through r.f. chokes 192 and 194. R.f. chokes 192 and 194 readily pass the relatively low frequency code signals from encoder 188 but present a high impedance to high frequency signals such as the impinging signal *f*. Harmonic generator 190, is in turn, connected across the terminals of the balanced transmission line that feeds tag antenna 162.

In operation of the tag FIG. 6, rectifier diode 164 and capacitor 168 function as a voltage recitfier 196, which generates a positive d.c. voltage greater than the threshold voltage of *e* volts at junction 173 when signals of suitable amplitude of frequency f impinge on antenna 162. Thus, amplifier 178 serves as a comparator generating an output signal (B+) only when the voltage at junction 173 ( and therefore the voltage at noninverting input 177 connected thereto) is greater than the reference voltage *e* applied to inverting input 184. The output signal of amplifier 178 is applied as a B+ voltage to the timing and encoding means 188. Thus, rectifier 196 and amplifier (comparator) 178, serve as switching means, responsive to received signals at predetermined frequency (*f*) for applying power to the timing and encoding means 188 only in the presence of such signals.

R. F. coupling capacitor 166*a* serves to isolate the D.C., the coding waveform, and the RF from mutual interference. It should be apparent to those skilled in the art that capacitor 168 discharges, in the absence of received signal, through the finite input resistance of amplifier 178 and the finite back resistance of diode 164 or through an appropriate shunt resistance (not shown).

Figure 7:
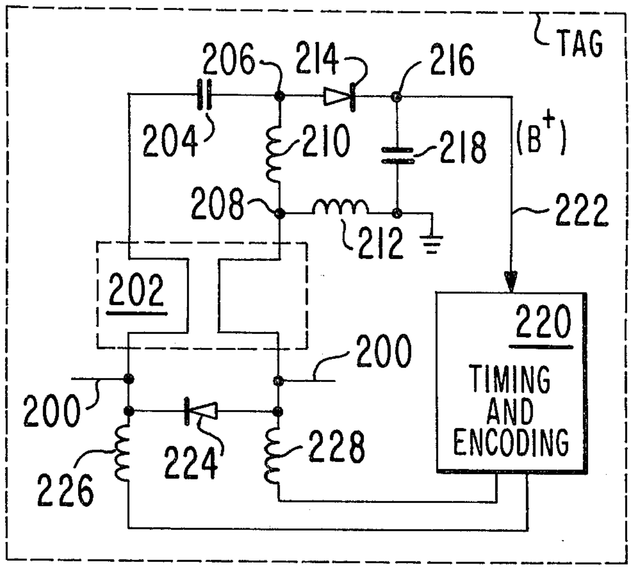
FIGS. 7 and 8 are schematics of alternate embodiments of the identification tag wherein the power for encoding and timing means are extracted from the impinging predetermined frequency signal.
Figure 8:
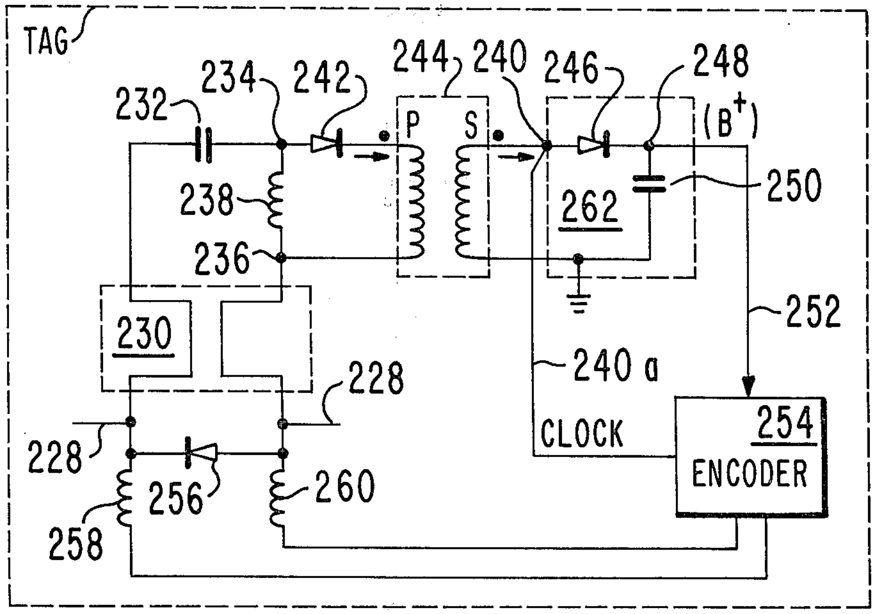

FIGS. 7 and 8 are schematics showing alternative embodiments of the identification tag wherein the power for operating the timing and encoding means is derived from the energy 86 impinging signal.

FIG. 7 illustrates schematically such a tag for use with a continuous wave (CW) impinging signal. The terminanls of the balanced transmission line that feeds tag antenna 200 are connected across suitable impedance transformation means such as one or more ¼ wave matching transformers 202, and therefrom, are respectively a.c. coupled through an r.f. capacitor 204 to junctions 206 and 208. Junctions 206 and 208 are d.c. coupled by an r.f. choke 210. Junction 208 is d.c. grounded through a second r.f. choke 212. Junction 206 is connected to the anode of a rectifying diode 214, the cathode of which being connected to junction 216. Junction 216 is r.f. bypassed to ground by capacitor 218. The voltage at junction 216 is applied as b+ voltage to the timing and encoding means 220 over line 222. The encoding means 220 communicates with a nonlinear element harmonic generator 224 through r.f. chokes 226 and 228. harmonic generator 224 is connected across the terminals of the balanced transmission line that feeds tag antenna 200.

In operation of the tag of FIG. 7, impedance transformation means 202 steps-up the impedance of antenna 200 thereby increasing the r.f. voltage with respect to ground seen at junction 206. Rectifying diode 214 and capacitor 218 rectify the voltage and produce a B+ voltage to power the timing and encoding means. The operation is otherwise the same as previously described.

FIG. 8 illustrates schematically a configuration of an identification tag wherein power for timing and encoding is derived from an amplitude modulated signal having a predetermined frequency. Specifically, the terminals of the balanced transmission line that feeds tag antenna 228 are connected across suitable impedance transformation means such as one or more ¼ λ matching transformers 230 and are respectively coupled, through a capacitor 232, to junctions 234 and 236. Junctions 234 and 236 are d.c. coupled through an r.f. choke 238. Junction 234 is connected to the anode of detecting diode 242, the cathode of which being applied to one terminal of the primary coil of a voltage step-up transformer 244. The other terminal of the primary is returned to junction 236. One terminal of the secondary coil of transformer 244 is connected to a junction 240 and therefrom to the anode of a rectifying diode 246. The voltage modulation signal at junction 240 is also applied over conductor 240*a* as the timing or clock signal to encoder 254. The cathode of diode 246 is connected to a junction 248, which is, in turn, A.C. bypassed to ground through a capacitor 250. The D.C. voltage derived at junction 248 is applied over line 252 as a B+ voltage to the encoding means 254. The encoding means 254 is coupled to a non-linear element harmonic generator 256 through r.f chokes 258 and 260. Harmonic generator 256 is, in turn, coupled across the terminals of the balanced transmissions that feeds tag antenna 228.

In operation of the tag of FIG. 8, the impedance of antenna 228 is stepped up by impedance matching means 230, thereby increasing the voltage levels of the modulation of the signal received by antenna 228 as seen at junction 234. Diode 242, detects the amplified modulation envelope of the received signal and applies the detected signal to the primary coil (P) of the step-up transformer 244. Transformer 244 further increases the voltage of the modulation signal and applies the signal to junction 240 and therefrom to encoder 254 as a clock signal and also to a rectifier 262, comprises of diode 246 and capacitor 150. The rectifier 262 derives a substantially constant B+ voltage, which is applied over conductor 252 to power the encoding means 254. The tag operates thereafter as previously described.

The standard dot notation is used on the modulation frequency step-up transformer 244.

Figure 9:
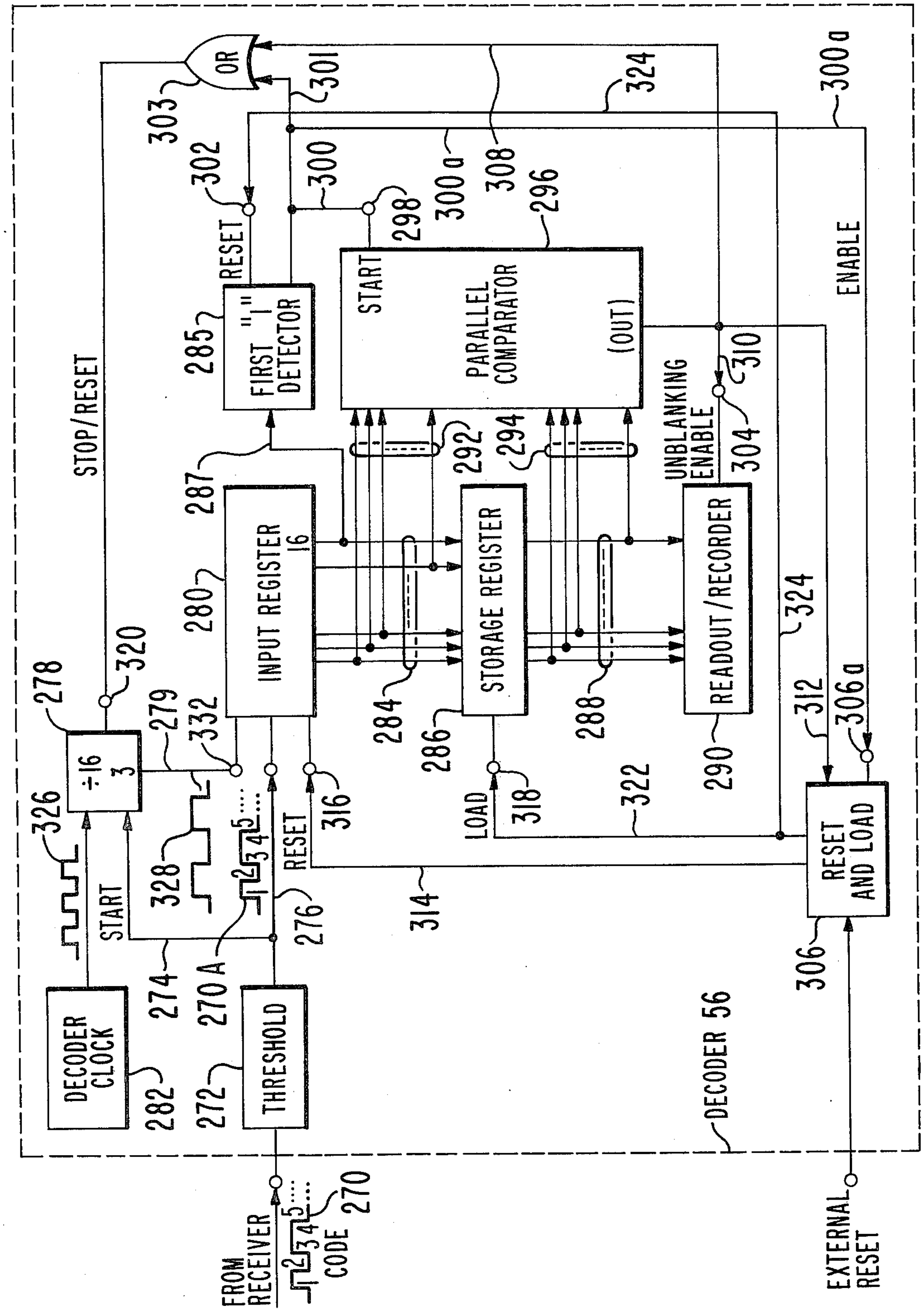
FIG. 9 is a block schematic of a preferred embodiment of a decoder.

Before proceeding to the other embodiments, reference is made to FIG. 1. The detector 52 in the receiver 14 as previously described produces an output signal representative of the code modulation impressed on the harmonic signal 34 reflected from tag 26. The code modulation is passed to receiver output terminal 20 and therefrom communicated to a decoder 56 in the output means 22. FIG. 9 is a schematic of a preferred embodiment of decoder 56, which will be now described in detail in conjunction with the wave-form chart shown in FIG. 10.

The identification code utilized in the preferred embodiment of the invention comprises a 32 bit code, having 16 active bits followed by 16 bits that are always zero, with the first of the 16 active bits being a logic 1.

The code modulation 270 from the receiver terminal 20 (FIG. 1) is coupled to a suitable adjustable threshold device 272, such as a suitable comparator in decoder 56. The output signals 270A of threshold device 272 are applied over conductors 274 and 276 to a 16-stage divider 278, which is also receptive of clock signals 326 from decoder clock 282, typically 400 KHz. Output signals 328 from the third stage of divider 278 are applied as clock signals to input register 280 over path 279. The output terminals of each of the member bits of input register 280 communicate in parallel over conductors 284 with an associated bit in a storage register 286. The output terminals of the 16th (last) member bit is also connected to a "first one detector" flip-flop 285 over conductor 287. The output terminals of the member bits of storage register 286, in turn, are coupled on a respective bit-to-bit basis over lines 288 with a read out/ recorder 290. The output terminals of each member bit of the input register 280 and storage register 286 are also coupled over lines 292 and 294, respectively, with a parallel comparator 296.

The comparator 296 receives at its start comparison terminal 298, output signals from flip-flop 285 over conductor 300. Flip-flop 285 also communicates its output signals over conductor 301, through ann OR gate 303, to stop terminal 320 of divider 278 and over conductor 300*a* to enable terminal 306*a* of a reset and load control 306.

Comparator 296, in response to a start comparison command from detector 285, generates an appropriate first output signal, here, a logical 1 when the contacts of input register 280 and storage register 286 are equal on a bit for bit basis and generates an appropriate second output signal, e.g. logic zero when the respective contents thereof are unequal. The output signals of comparator 296 are applied to (1) the stop terminal 320 of divider 278 via OR gate 303, (2) the unblanking/enable input terminal 304 of read out/recorder 290 and (3) reset and load control 306 over conductors 308, 310 and 312, respectively.

Reset and load control 306, typically an arrangement logic gate applies, in response to appropriate output signals, a first output signal over conductor 314 to the reset input terminal 316 of input register 280, and a second output signal to the load control input 318 of storage register 286 and the reset terminal 302 of flip-flop 285 over conductors 322 and 324, respectively.

In operation, threshold devices 272 serves to prevent spurious relatively low level signals from entering the decoder by making requisite a desired signal-to-noise ratio, e.g. suitably in the range of 3 to 6 db. In addition, the bandwidth of threshold device 272 may be narrower than the bandwidth of receiver 14, suitably by a factor of 3 to 1, to further reduce the possibility of a spurious signal causing decoder error. Threshold device 272 may also act as an interface between the code modulation 270 and the decoder logic, which converts the code modulation signals to appropriate voltage levels compatible with the logic circuits of decoder 56 or alternatively, as a gate, which, once set by an appropriate signal level, passes signals for a time sufficient for the decoding process. With the exception of threshold device 272, the decoder 56 may be implemented entirely in TTL logic chips, thereby allowing the decoder to be in an advantageous compact form.

In operation of the decoder of FIG. 9, the first positive going transition of code 270 (and therefore of identical converted code 270A) enables counter/divider 278 and causes counter/divider 278 to become responsive to clock signals 326. Counter/divider 278 thereafter counts in accordance with the clock signals 326 from the decoder clock 282. The frequency (400 KHz) of decoder clock 282 is chosen at a multiple, suitably 8, of the frequency of the clock signals produced by the timing means (50 KHz) in tag 26, i.e., the time base of code modulation 270.

Figure 10:
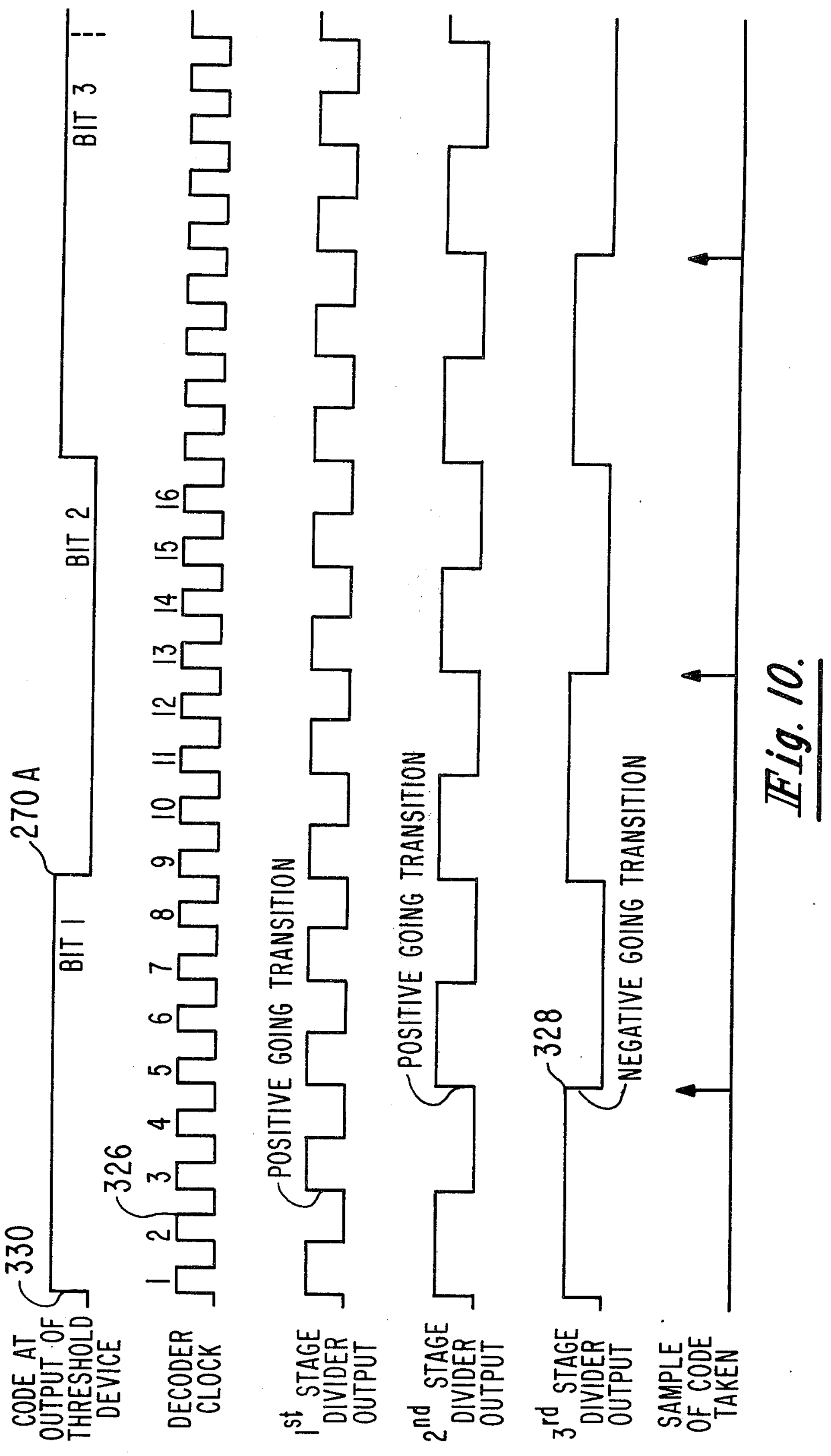
FIG. 10 is a chart showing the timing relationship of the various signals involved in the decoding process, in accordance with the decoder illustrated in FIG. 9.

Input register 280 samples and stores the instantaneous logic level of codeword 270A in accordance with negative transitions in the output signals 328 over line 279 from the third state of divider 278 for reasons as will be described. With reference to FIG. 10, the first positive-going transition 330 of converted code modulation 270A enables counter/divider 278 to receive decoder clock pulses 326. The first stage of counter/divider 278 thereafter changes state with every positive-going transition of decoder clock signal 326. Similarly, the second stage of divider 278 changes state in accordance with every positive-going transition in the output signal of the first stage. The third stage, in turn, changes state in accordance with every positivegoing transition in the output signal of the second stage, and so on. Thus, the third stage output signal 328 will initially change state, from logic one to logic zero, after 4 cycles of decoder clock signal 326 and will make subsequent negative-going transitions henceforth after every eight cycles of decoder clock signal 326. As illustrated in FIG. 10, the negative-going transitions of the third state output signal 328 occur in the center of each of the modulation code 270A bits. By sampling code 270A in accordance with the negative-going transitions of the third stage output signal, the code bits are sampled essentially in the middle of their allotted time period, thus alleviating the need for an absolute frequency lock between the clock signals of tag 26 and the decoder clock signal 236 of decoder 56. Relative frequency shift between the tag clock and the decoder clock can be as much as ±½ bit per word without affecting the accuracy of the decoder. Thus, for a 16 active bit code word, a prescribed accuracy of approximately 3% can easily be attained utilizing crystal controlled oscillators for the respective clocks.

Referring again to FIG. 9, it is seen that third stage output signal 328 is accordingly applied over line 279, as a clock signal to "shift and load" input terminal 332 of input register 280. The converted code 270A is therefore sampled, over line 276 and stored in the first member bit of input shift register 280, in accordance with the negative-going transition of signal 328. Previously stored data is accordingly shifted within the register with each subsequent sampling, until the first code bit, as previously noted being, for the present arrangement, a logic 1, is shifted into the 16th (last) member bit of input register 280.

The presence of a logic one value in the 16th member bit of input register 280 is detected by "first one detector" flip-flop 285, which accordingly generates an output signal. The first one detector output signal is passed through OR gate 303 and applied to stop terminal 320 of counter/divider 278, thereby inhibiting divider 278 and hence stopping clock signals 328 to the input register 280. The first one detector output signal is also applied over conductor 300 to the start terminal 298 of compartor 296, thereby initiating the comparator 296 a parallel, bit-for-bit comparison of the contents of input register 280 and storage register 286.

Comparator 296 generates a first output signal (a logical one) in accordance with a favorable comparison and a second output signal (a logical zero) in accordance with an unfavorable comparison.

The readout/recorder 290, is responsive to first output signals (logic 1) from the comparator (indicative of a favorable comparison) applied to its unblanking/enable terminal 304. The application of the appropriate signal to terminal 304, causes readout/recorder 290 to become receptive of information carried on parallel line 288. Thus, the contents of the storage register 286 are transferred to readout/recorder 290 over lines 288 and are therein recorded and/or converted to decimal form and displayed in any suitable way as desired. Readout/recorder means 290 may thereafter suitably reset the system (not shown) or the system may be reset manually (as shown in FIG. 9).

If the comparison is unfavorable, the comparator 296 generates an appropriate second output signal (logical zero) to which reset and load control 306 and divider 278 (through OR gate 305) are responsive. Reset and load control 306 accordingly generates the aforementioned first and second output signals which effect a parallel transfer of the contents of input register 280 into storage register 286 through parallel lines 284, clear input register 280 and reset first one detector flip-flop 285. The divider 278 is reset, uninhibited, and is thereafter restarted by the next positive-going transition received at its start terminal over line 274.

With reference to FIGS. 1 and 9, it should be understood that as beam 24 impinges on tag, 26, tag 26 reflects or retrodirects harmonically related beam 34, pulse modulated in accordance with a 32 bit code word comprising 16 active bits and 16 offtime bits with the first active bit always having a logic 1 value. Beam 34 is detected via the receiver 14, and code modulation 270 is communicated to the decoder 56. Decoder 56 is actuated by the first logic 1 value bit in the word received and thereafter samples, and loads into input shift register 280, 16 consecutive code bits. The sampled code word is compared with the contents of storage register 286, which is initially zero, and the sampled word is therefore loaded into storage register 286. If beam 24 impinged upon tag 26 at such a time that the first logic one value received by the decoder is by coincidence the first active bit of the code word (requisitively a logic one value) an accurate sampling of the code is stored in storage register 286. Thus, the next sampled word will compare favorably with the stored word and will therefore be recorded.

However, if beam 24 impinges on tag 26 at such a time that the first logic one value received by decoder 56 is not the first active bit of the code word 270, an inaccurate sampling of the word would result; e.g. if the initial reflected reply is initiated on bit 2 of code word 270, the decoder would be activated by bit 3 of code word 270 and active bits 3–16, and off the time bits 1 and 2 of the code word would be sampled and subsequently stored in storage register 286. In view of the 16 bit offtime of identification code work 270, however, the second sample taken by decoder 56 necessarily begins with the first active bit of the word, regardless of where in code word 270 the first sampling was initiated. The comparison of the subsequent sampling with the first will therefore be unfavorable and the accurate subsequent sampling will replace the inaccurate first in storage register 286. A third sampling taken by decoder 56 will therefore favorably compare with the stored word and will be recorded by readout/recorder means 290.

The decoder, therefore, requires two consecutive identical receptions of the code modulation 270 to assure an accurate identification and recording or display or such identification. Consequently, in order to ensure accurate identification in instances where beam 24 impinges on tag 26 at such a time that the first logic 1 value recorded by decoder 56 is not the first active bit of the code word 270, the bit rate of the identification code, i.e. the frequency of the timing means or clock in tag 26, must be chosen so that a minimum of three reradiated replies will be generated during that time interval that the tag is within the predetermined frequency beam 24. Systems have been implemented utilizing a 50,000 bit per second code, which is capable of accurate identification of tags passing through beam 24 at speeds up to 100 miles per hour.

Figure 11:
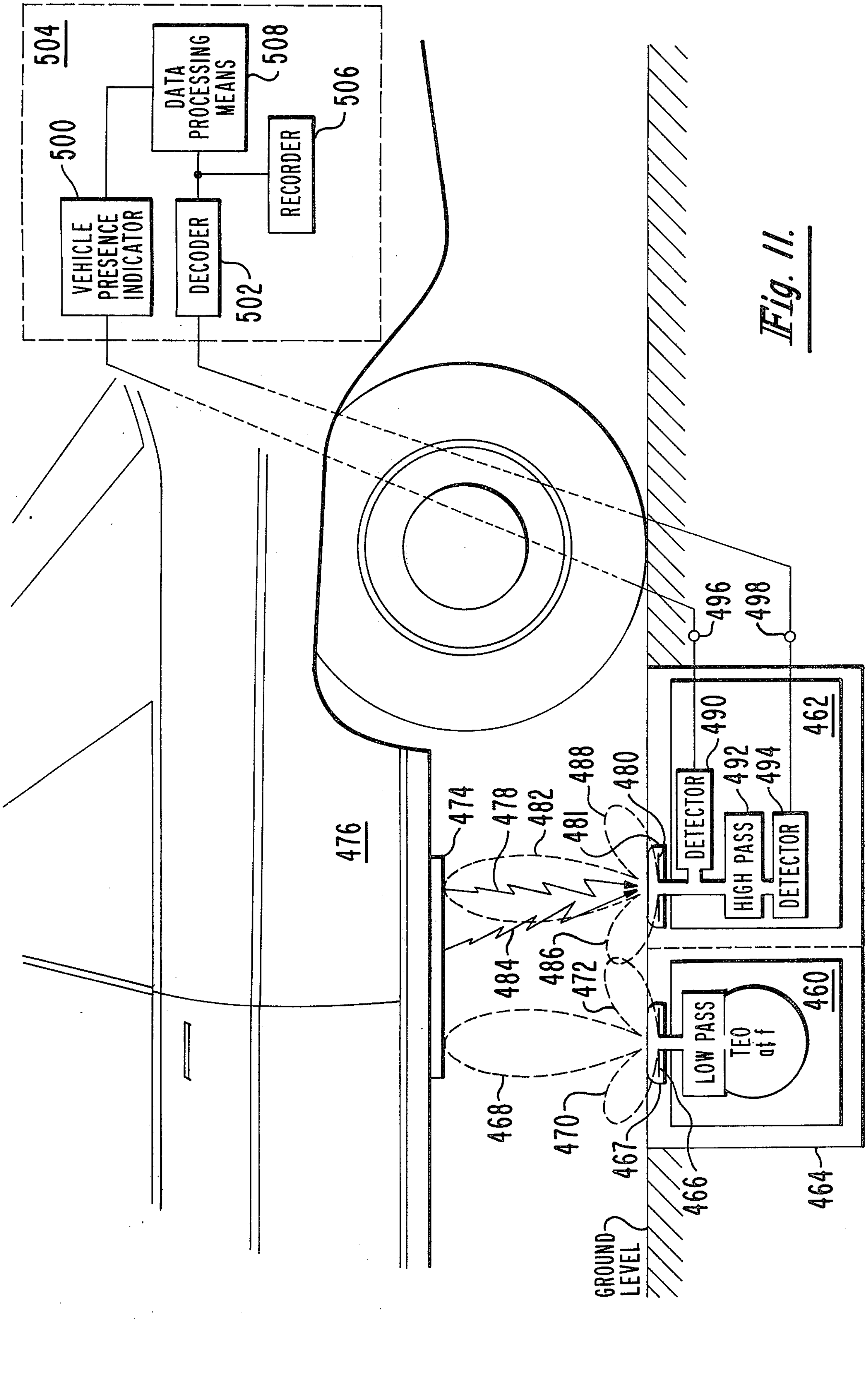
FIG. 11 is a schematic diagram of an embodiment of the invention utilized as a vehicle detection and identification system.

Referring now to FIG. 11, there is a schematic of a vehicle identification system embodying the present invention. Transmitter 460 and receiver 462 are situated in a station 464 located below ground level in the access to a toll road.

Transmitter 460 (similar to transmitter 10, FIG. 1 previously described) continuously generates electromagnetic energy at a predetermined frequency *f*, which is transmitted in an upward substantially vertical direction by transmitting antenna 466, which, in turn, is situated in an appropriate radome 467. The radiation pattern of the transmitted signal is generally indicated in FIG. 11, as main beam 468, and first and second side lobes 470 and 472, respectively.

A vehicle having access to the system on the toll road is assigned a tag (26 FIG. 1, etc.) having a unique and individual identification code number. Such a tag 474 is shown suitably affixed to vehicle 476, for cooperation with the transmitter and receiver. When vehicle 476 passes over station 464, tab 464 is illuminated by the main beam 468. Tag 474, as previously explained retrodirectively radiates a beam 478 of signals at a chosen harmonic of the predetermined frequency, pulse-modulated in accordance with the identification code in the manner described above. Signals of the predetermined frequency are also reflected from tag 474 and vehicle 476, and are, illustratively, indicated as beam 484. Vehicles with no tag or with an inoperative tag therefore reflect, in the skin-radar type reflection sense, only signals at the predetermined frequency *f*.

Receiver 462 of the type described above, e.g. 14 of FIG. 1) is coupled to a receiving antenna 480, which is situated in a suitable radome 481. Antenna 480 is arranged to have a response pattern with a main lobe 482 in an upward substantially vertical direction and including first and second side lobes, 486 and 488.

As illustrated in FIG. 11, by the overlapping of the second side lobe 472 of antenna 466 and the first side lobe 486 of antenna 480 owing to close proximity of the transmitter and receiver antenna, there may be a small but finite direct leakage between the transmitter 460 and receiver 462. Thus, antenna 480 receives a small leakage signal of predetermined frequency *f*, the retrodirection harmonic beam 478 and the skin-radar reflected signals 484 reflected from the passing vehicle 476.

The signals received by antenna 480 are passed to a first detector 490 and in parallel therewith to a series combination of high pass filter 492 and second detector 494 within receiver 462.

Detector 490 generates an output signal which is representative of any modulation or change from steady state in the signals received by antenna 480. The leakage signal is essentially a steady state constant value and can be monitored to establish that transmitter 460 is in proper operation. Detector 490 generates output signals different from steady state value only when the passage of a vehicle creates reflected (or radiated) signals, either of the predetermined base frequency (*f*) of the transmitter or at the chosen harmonic. High pass filter 492 effectively attenuates all signals not of the chosen harmonic frequency and the output signals of second detector 494 are thus indicative of the identification code pulse-modulated signals from the tag. The output signals of detector means 490 and 494 are respectively passed to receiver output terminals 496 and 498, and are therefrom communicated to a vehicle presence indicator 500, and decoder 502 within a remote output means 504. The decoder translates the detected pulse modulation code into a suitable recordable form, which is stored by recorder 506. The output signals of vehicle presence indicator 500 and decoder 502 are passed to suitable data processing means 508.

If passing vehicle 476 as no tag, or has an inoperable tag, only signals of the predetermined base frequency f will be reflected. The reflected f frequency signals will cause the first detector 490 to generate an output signal and thereby actuate the vehicle presence indicator but no identification code will be registered on the decoder. Data processing means 508 can, accordingly generate a warning to the proper authorities. Similarly, data processing means 500 can generate a warning upon the passing of a vehicle with a specified identification number.

The recorder 56 is periodically read and bills or credits for pre-paid tickets can be sent to the owners of those vehicles recording as passing. Thus, a toll road can be effectively maintained without requiring the vehicles to reduce spped at tolling stations.

An alternative to the above described system is to establish the transmitting and receiving antennas in randoms situated in the side of a toll station and suitably affix the tag to the side of the vehicle. The alternative method may be of particular utility in converting previously established toll stations.

Similarly, mobile or hand held stations, may be established. An experimental vehicle identification system using a 50,000 bit/sec. code has been implemented and tested. The tag was suitably affixed to an automotive vehicle and a mobile station was established at road side. The system was tested and proven accurate at vehicle speeds up to and including 40 miles per hour. It has been calculated that such a system using the 50,000 bit/sec. code is accurate for vehicles passing the station 464 at speeds up to 100 miles per hour.

The threshold device in an experimental unit was set to establish a signal to noise ratio between 3 and 6 db. The transmitter radiated 150 milliwatts of power and utilized a 25 db. gain transmitting antenna. The receiver similarly used a 25 db. gain receiving antenna, and used direct detection. The maximum range of the system, for the above noted parameters is found to be approximately 10 ft.

The sensitivity of the implemented system can be improved by a factor of 30 to 40 db. by utilizing a superhetrodyne configuration, i.e. a homodyne, rather than direct detection of the code modulations. Thus, for the same maximum range, smaller, lower gain transmitting and receiving antennas can be utilized.

Figure 12A:
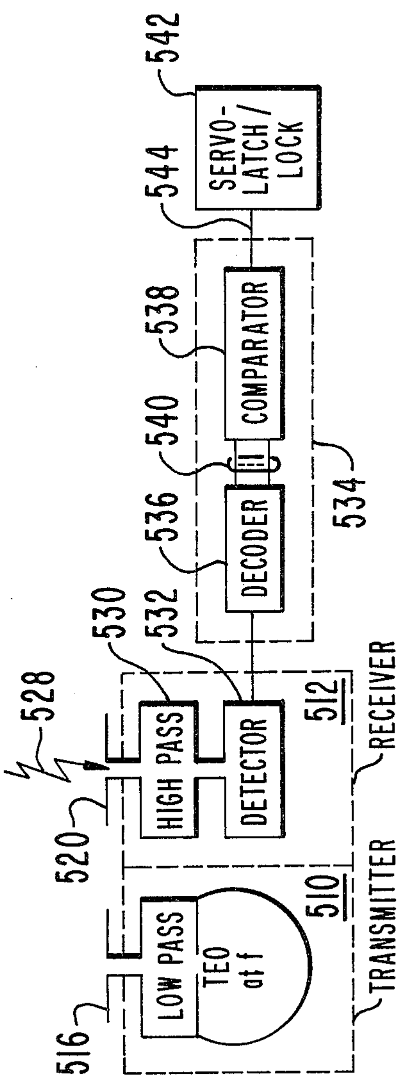
FIGS. 12 and 12*a* are schematics showing an embodiment of the invention utilized as an automatic locking device.
Figure 12:
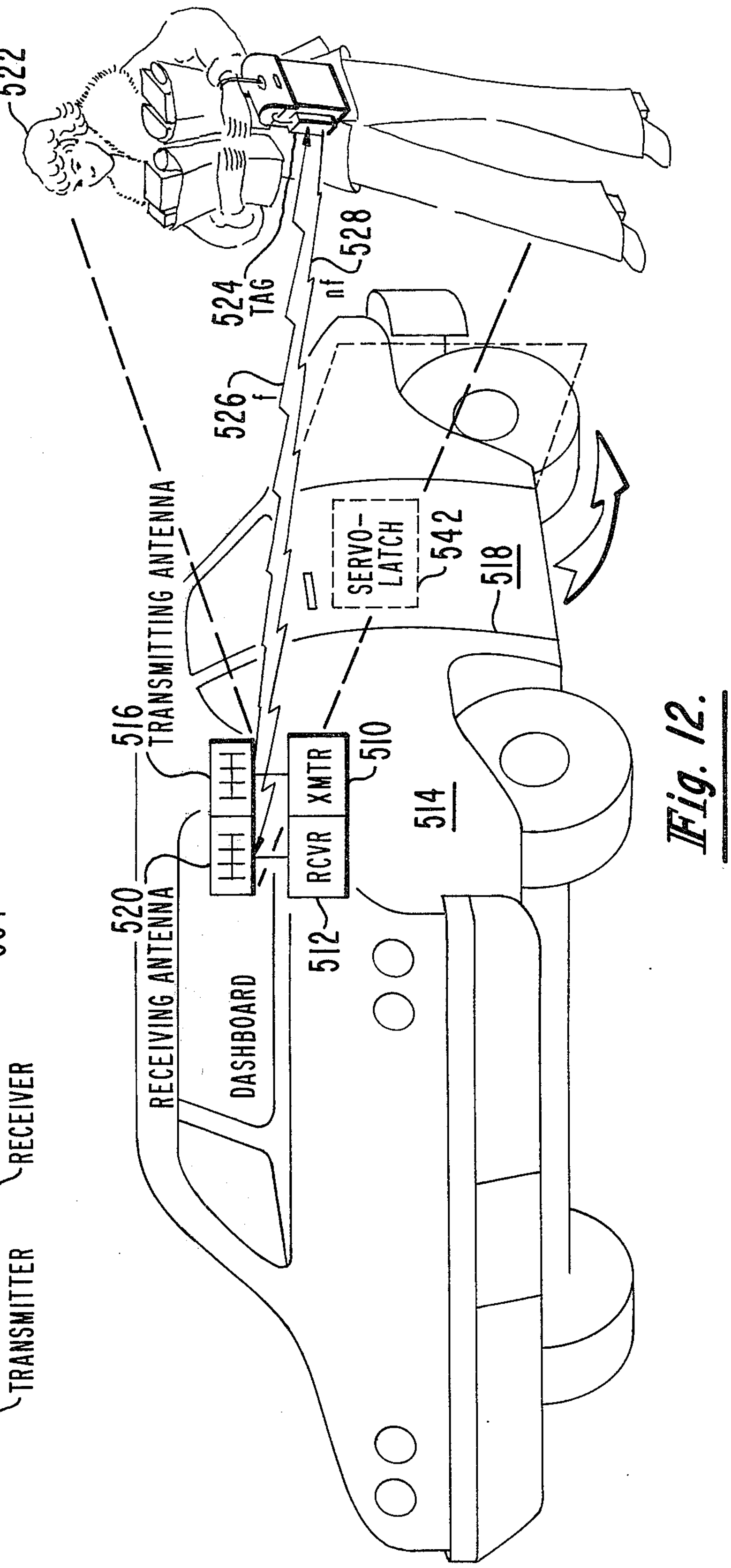

FIG. 12 is a pictorial illustration of a remotely actuated electronic lock embodying the present invention. A transmitter 510 and a receiver 512 are suitably attached to or within a vehicle 514 or some other lockable enclosure. Transmitter antenna 516 is suitably arranged to illuminate the approach to the vehicle door 518 or other suitable entrance means. Similarly, transmitting antenna 516 is suitably arranged to receive harmonically related signals reflected from the approach area. When a person 522 carrying a tag 524 with a specified preset identification code number approaches the vehicle door 518, a beam 526 of predetermined frequency *f* impinges on tag 524. Tag 524 responsively radiates a code-modulated harmonically related beam 528, which is received by receiving antenna 520.

FIG. 12a is a schematic showing such a system. With reference to FIG. 12a, it is seen that received modulated signals 528 from the approaching tag 524 are communicated from receiving antenna 520, through a high pass filter 530, to a detector 532. Detected code-modulation signals are therefrom passed to output means 534 comprising suitable decoder 536 and a suitable comparator 538. Decoder 536 is receptive of the detected code modulations and establishes the identification code number of approaching tag 524. Comparator 538 has applied in parallel, over parallel line 540, the established identification code number of approaching tag 524, and compares the established code number with a preset code number. Comparator 538 is operationally coupled over line 544 to a suitable servo-latching and/or locking means 542.

If the identification code number of the approaching tag is identical to that preset in comparator 538, comparator 538 generates an output signal over line 544 to activate servo-latching means 542 and open the vehicle door 518.

It is apparent from the foregoing description that the present invention provides a particularly advantageous electronic detection and identification system. It will be understood that the above description is of illustrative embodiments of the present invention and that the invention is not limited to the specific forms shown. Modifications may be made in the design and arrangement of the elements without departing from the spirit of the invention.

What is claimed is:

1. A short range detecting and identification system of the type including a transmitter, a receiver, and at least one identification tag remotely situated relative to the transmitter and receiver, said transmitter transmitting electromagnetic energy signals of a predetermined frequency, wherein:

said tag comprises:

a harmonic radiator for deriving from said signals of said predetermined frequency signals harmonically related thereto and selectively radiating said harmonically related signals in a direction to said receiver, encoding means, responsive to a clock signal, for modulating said derived harmonically related signals in accordance with a predeterined digital identification code, and timing means, for deriving said clock signal; and said receiver comprises:

first detector means for detecting said modulated harmonically related signal radiated from said tag and generating output signals indicative of the identification code modulation of said radiated signal, and second detector means for sensing the presence of reflected signals of said predetermined frequency whereby the presence of an inoperative tag is sensed.

2. The system of claim 1 wherein:

said transmitter and said receiver antennas are mounted below gound level and maintain radiation pattern main lobes directed in an upward substantially vertical direction.

3. The system of claim 2 wherein:

said transmitter and said receiver antennas are situated such that the respective radiation patterns of said antennas overlap thereby generating a substantially constant low level signal in said receiver whereby an inoperative transmitter-receiver station may be detected.

4. The system of claim 1, wherein said signals harmonically related to said signals of predetermined frequency are the second harmonic of said predetermined frequency.

5. In a short range detecting and identification system of the type including a transmitter, a receiver, and at least one identification tag remotely situated relative to the transmitter and receiver, the transmitter transmitting electromagnetic energy signals of a predetermined frequency, and the receiver including means for detecting pulse modulated signals from the tag harmonically related to the predetermined frequency signal;

an improved identification tag comprising:

antenna means for receiving said predetermined frequency signal and selectively radiating said harmonically related signals in a direction to said receiver;

a non-linear device, coupled to said antenna means, for deriving from said signals of said predetermined frequency signals harmonically related thereto;

timing means, for deriving a clock signal;

storage means for storing a binary code word indicative of a predetermined digital identification code;

shift register means, for progressively advancing a stored code to successive member bits in accordance with said clock signals; and mode selection means for alternatively loading said shift register means with said stored binary code word and applying the output signal of a specified member bit of said shift register means as a biasing voltage to said non-linear device in accordance with said identification code.

6. The tag of claim 5, wherein said signals harmonically related to said signals of said predetermined frequency are the first harmonic of said predeterined frequency.

7. In a short range detecting and identification system of the type including a transmitter, a receiver and at least one identification tag remotely situated relative to the transmitter and receiver, the transmitter transmitting an on-off amplitude modulated wave of a predetermined frequency having a specified duty cycle and the receiver including means for detecting pulse modulated signals from the tag harmonically related to said predetermined frequency signal; an improved identification tag comprising:

a harmonic radiator for deriving, from said signals of said predetermined frequency, signals harmonically related thereto and selectively radiating said harmonically related signals in a direction to said receiver;

coding means, responsive to a clock signal, for pulse modulating said derived harmonically related signals in accordance with a predetermined digital identification code; and timing means including an envelope detector receptive of said predetermined frequency signal, for deriving said clock signal.

8. In a short range detecting and identification system of the type including a transmitter, a receiver and at least one identification tag remotely situated from the transmitter and receiver, the transmitter transmitting a signal of predetermined frequency and the receiver including means to detect pulse modulated signals from the tag harmonically related to said predetermined frequency signal; an improved tag comprising:

a harmonic radiator for deriving, from said signals of said predetermined frequency, signals harmonically related thereto and selectively radiating said harmonically related signals in a direction to said receiver, encoding means, responsive to a clock signal, for pulse modulating said derived harmonically related signals in accordance with a predetermined digital identification code;

timing means, for deriving said clock signal;

a power source; and switching means, responsive to said predetermined frequency signals, for applying said power source to said encoding means and said timing means only during such time as said tag is illuminated by said predetermined frequency signal.

9. In a short range detecting and identification system of the type including a transmitter, a receiver and at least one identification tag remotely situated from the transmitter and receiver, the transmitter transmitting a continuous wave signal of predetermined frequency and the receiver including means to detect pulse modulated signals from said tag harmonically related to said predetermined frequency signal; an improved tag comprising:

a harmonic radiator including an antenna and a non-linear device, said antenna being coupled across said non-linear device, for deriving from said signals of said predetermined frequency signals harmonically related thereto and selectively radiating said harmonically related signals in a direction to said receiver;

encoding means, responsive to a clock signal, for pulse modulating said derived harmonically related signals in accordance with a predetermined digital identification code; timing means, for deriving said clock signal; and means for extracting power for said encoding means and timing means from said predetermined frequency signal including impedance transforming means, receptive of said predetermined frequency signal as received at said antenna, for stepping-up the impedance of said antenna; and rectifier means, receptive of the output signals of said impedance matching means; and filter means for establishing direct current signal.

10. A short range detecting and identification system of the type including a transmitter, a receiver and at least two identification tag remotely situated from the transmitter and receiver; said transmitter illuminating the approach to an entrance to an enclosure with a signal of predetermined frequency;

said receiver being arranged to receive signals harmonically related to said predetermined frequency signal radiated from said tag from positions in the approach;

said tag comprising:

a harmonic radiator for deriving, from said signals of said predetermined frequency, said signals harmonically related thereto and selectively radiating said harmonically related signals in a direction to said receiver;

encoding means, responsive to a clock signal, for pulse modulating said derived harmonically related signals in accordance with a predetermined digital identification code and timing means, for deriving said clock signal; wherein:

said entrance is closable and includes latching means; and said receiver is operably connected to said latching means and activates said latching means in accordance with said predetermined identification code number.

* * * * *

UNITED STATES PATENT OFFICE
CERTIFICATE OF CORRECTION

PATENT NO. : 3,914,762

DATED : October 21, 1975

INVENTOR(S) : Richard Joseph Klensch

It is certified that error appears in the above-identified patent and that said Letters Patent are hereby corrected as shown below:

Column 1, line 27, "close" should be --closed--

Column 4, line 15, "double" should be --doubler--
Column 4, line 35, "double" should be --doubler--
Column 4, line 55, "cromagnetic" should be --tromagnetic--

Column 5, line 53, "antanna" should be --antenna--

Column 6, line 68, "to a logical zero," should read --to a logical one or a logical zero,--

Column 7, line 4, "330" should be --30--

Column 7, line 24, "valve" should be --value--

Column 10, line 43, "harmonic" should be --Harmonic--

Column 11, line 25, change "comprises" to --comprised--

Column 11, line 26, change "150" to --250--

Column 12, line 27, change "devices" to --device--

Column 13, line 45, change "compartor" to --comparator--

Column 14, line 1, change "305" to --303--

Column 14, line 5, change "lines" to --line--

Column 14, line 27, "tively" should be --tely--

Column 14, line 41, change "work" to --word--

Column 14, line 58, change "recorded" to --received--

CERTIFICATE OF CORRECTION

PATENT NO. : 3,914,762

DATED : October 21, 1975

INVENTOR(S) : Richard Joseph Klensch

It is certified that error appears in the above-identified patent and that said Letters Patent are hereby corrected as shown below:

Column 15, line 20, change "tab 464" to --tag 474--

Column 16, line 7, change "as" to --has--

Column 16, line 16, change "passing" to --passage--

Column 16, line 18, change "56" to --506--

Column 16, line 23, change "spped" to --speed--

Column 16, lines 24 and 25, change "randoms" to --radomes--

Column 17, line 46, change "predeterined" to --predetermined--

Column 17, line 60, change "gound" to --ground--

Column 20, line 13, change "two" to --one--

Signed and Sealed this

*eleventh* Day of *May 1976*

[SEAL]

*Attest:*

RUTH C. MASON
*Attesting Officer*

C. MARSHALL DANN
*Commissioner of Patents and Trademarks*